United States Patent [19]

Miyake et al.

[11] Patent Number: 5,165,764
[45] Date of Patent: Nov. 24, 1992

[54] BRAKING HYDRAULIC PRESSURE CONTROL DEVICE

[76] Inventors: Katsuka Miyake, 2-2-14, Matsubara, Konosu-shi, Saitama; Takashi Kunimi, 6-13-4, Nishiarai, Adachi-ku, Tokyo; Fumio Kato, 1932-11, Kakura, Iwatsuki-shi, Saitama; Hideki Kakizaki, No. 9, Yui-garden, 3-20-3, Hanasaki, Kazo-shi, Saitama; Yukimasa Mitsude, 1-26-1, Onuma, Kasukabe-shi, Saitama; Naoyuki Hagiya, 1-30-11, Kuge, Kazo-shi, Saitama, all of Japan

[21] Appl. No.: 640,038

[22] Filed: Jan. 11, 1991

[30] Foreign Application Priority Data

Jan. 12, 1990 [JP] Japan .................. 2-1702[U]

[51] Int. Cl.⁵ .............................. B60T 8/44
[52] U.S. Cl. .................... 303/113.2; 303/116.2
[58] Field of Search ....... 303/116 R, 116 JP, 113 TR, 303/0.1, 0.2, 110, 116 PC; 180/197

[56] References Cited

U.S. PATENT DOCUMENTS

| 4,861,118 | 8/1989 | Burckhardt et al. | 303/113 TR |
| 4,865,399 | 9/1989 | Atkins et al. | 303/116 SP |
| 5,013,097 | 5/1991 | Gutzeit et al. | 303/116 R |

FOREIGN PATENT DOCUMENTS

| 320943 | 6/1989 | European Pat. Off. . | |
| 2137904 | 7/1982 | Fed. Rep. of Germany ... | 303/116 R |
| 3119803 | 12/1982 | Fed. Rep. of Germany . | |
| 0049579 | 3/1988 | Japan | 303/113 TR |
| 301155 | 12/1988 | Japan . | |
| 301157 | 12/1988 | Japan . | |
| 52564 | 2/1989 | Japan . | |
| 0111558 | 4/1989 | Japan | 303/116 SP |
| 0231256 | 9/1990 | Japan | 303/113 TR |
| 2078323 | 1/1982 | United Kingdom . | |

*Primary Examiner*—Matthew C. Graham
*Attorney, Agent, or Firm*—Knobbe, Martens, Olson and Bear

[57] ABSTRACT

A braking hydraulic pressure control device includes an antilock control system and a traction control system in integrally combined form. A first valve unit for preventing liquid returning is included in a hydraulic pressure master path extending from a master cylinder to a wheel cylinder of a driving wheel, a second valve unit is provided for maintaining the internal hydraulic pressure of the wheel cylinder, a hydraulic pressure return path from the wheel cylinder is connected through a third valve unit to the inlet side of the first valve unit, and a hydraulic pressure auxiliary path for supply of a braking liquid is connected to the inlet side of the second valve unit included in the hydraulic pressure master path.

3 Claims, 2 Drawing Sheets

BRAKING HYDRAULIC PRESSURE CONTROL DEVICE

BACKGROUND OF THE INVENTION

This invention relates to a braking hydraulic pressure control device used in vehicles such as cars and more particularly, to an improvement of the braking hydraulic pressure control device having an antilock control mechanism for preventing wheel locking during vehicle braking and a traction control mechanism for preventing wheel slipping during vehicle starting.

FIG. 2 shows a conventional braking hydraulic pressure control device having an antilock control mechanism and a traction control mechanism, which specifically comprises an antilock control system 21 for virtually performing antilock control and a traction control system 22 for virtually performing traction control.

In the antilock control system 21, a hydraulic pressure path 25a from a master cylinder 12 coupled to a brake pedal 23 is connected through a hold valve 26 (made of an electromagnetic valve of the normally open type) and a traction piston 27 to a wheel cylinder 13.

A hydraulic pressure path 25b branched at the hold valve 26 is connected through a first decay valve 28 (made of an electromagnetic valve of the normally closed type) to a reservoir 30. Provided between the reservoir 30 and the master cylinder 12 is a hydraulic pressure return path 31 which includes a first pump 33 driven by a first motor 32, so that a braking liquid from the reservoir 30 is pressurized and returned to the side of the master cylinder 12.

On the other hand, in the traction control system 22, a hydraulic pressure path 35a from a reservoir 34 includes a second pump 37 driven by a second motor 36, so that the braking liquid is accumulated in an accumulator 38. In the hydraulic pressure path 35a, a relief valve 39 is connected across the second pump 37 to form a bypass path 35b. A hydraulic pressure path 35c from the accumulator 38 is connected through a buildup valve 40 (made of an electromagnetic valve of the normally closed type) to the traction piston 27. A hydraulic pressure return path 35d extending from the traction piston 27 to the reservoir 34 includes a second decay valve 41.

In the foregoing circuit, during antilock control, the hold valve 26 and the first decay valve 28 are operated, so that the braking liquid from the wheel cylinder 13 is absorbed into the reservoir 30 to prevent wheel locking. Then, the braking liquid in the reservoir 30 is pumped up by the first pump and returned to the inlet side of the hold valve 26. When wheel braking is necessary, the hold valve 26 is opened, so that the braking liquid is again applied to the wheel cylinder 13 to perform wheel braking.

During traction control, the second decay valve 41 is closed and the buildup valve 40 is opened, so that the braking liquid held in the accumulator 38 acts to operate the traction piston 27 or is applied to the wheel cylinder 13 to perform driving wheel braking, thereby preventing driving wheel slipping.

In the foregoing conventional structure, since the antilock control system 21 and the traction control system 22 are independent of each other and connected to the wheel cylinder 13 separately, the braking piping is complicated and the braking liquid is not supplied sufficiently.

Especially, since the supply system of the braking liquid is charged by operating the traction piston 27, the circuit structure of hydraulic pressure is complicated, and since the first and second pumps 33 and 37 are driven by separate motors (the first and second motors 32 and 36), the control device is large in size and the operation efficiency of each motor is low.

In view of the foregoing, it is an object of the present invention to simplify a hydraulic pressure circuit structure, thereby miniaturizing a braking hydraulic pressure control device and making it operate efficiently.

SUMMARY OF THE INVENTION

A braking hydraulic pressure control device according to the present invention comprises a first valve unit for preventing liquid returning which is included in a hydraulic pressure master path extending from a master cylinder to a wheel cylinder of a driving wheel, a second valve unit for maintaining the internal hydraulic pressure of the wheel cylinder, a hydraulic pressure return path which extends from the wheel cylinder through a third valve unit to the inlet side of the first valve unit, and a hydraulic pressure auxiliary path for supplying a braking liquid to the inlet side of the second valve unit included in the hydraulic pressure master path.

Therefore, since the first valve unit such as a cut valve is included in the hydraulic pressure master path, a so-called antilock control system and a so-called traction control system are combined integrally together; thus, the piping (particularly of branching) of the control device can be remarkably simplified and the transmission efficiency of hydraulic pressure can be enhanced.

Further, since the antilock control system and the traction control system are combined integrally together, any traction piston for changing a control mode is not necessary.

Specifically, a first pump may be included in the hydraulic pressure return path, a second pump may be included in the hydraulic pressure auxiliary path to supply a pressurized liquid to an accumulator, and both pumps may be driven by one motor. In this case, the number of motors can be decreased and the size and weight of the whole control device can be reduced as compared with the prior art.

Accordingly, the whole control device can be miniaturized and its braking control action can be exerted efficiently.

DESCRIPTION OF THE PREFERRED EMBODIMENT

Figure 1:
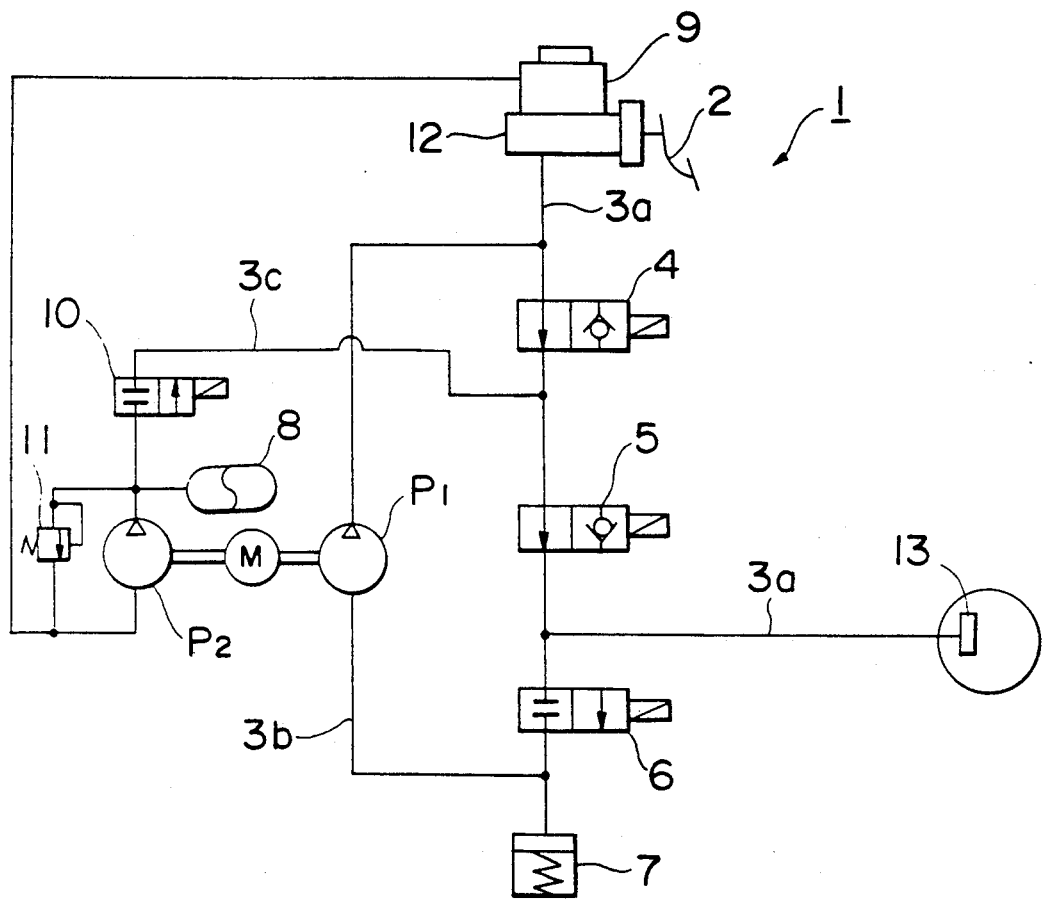
FIG. 1 is a schematic diagram showing a hydraulic pressure circuit according to the present invention.
Figure 2:
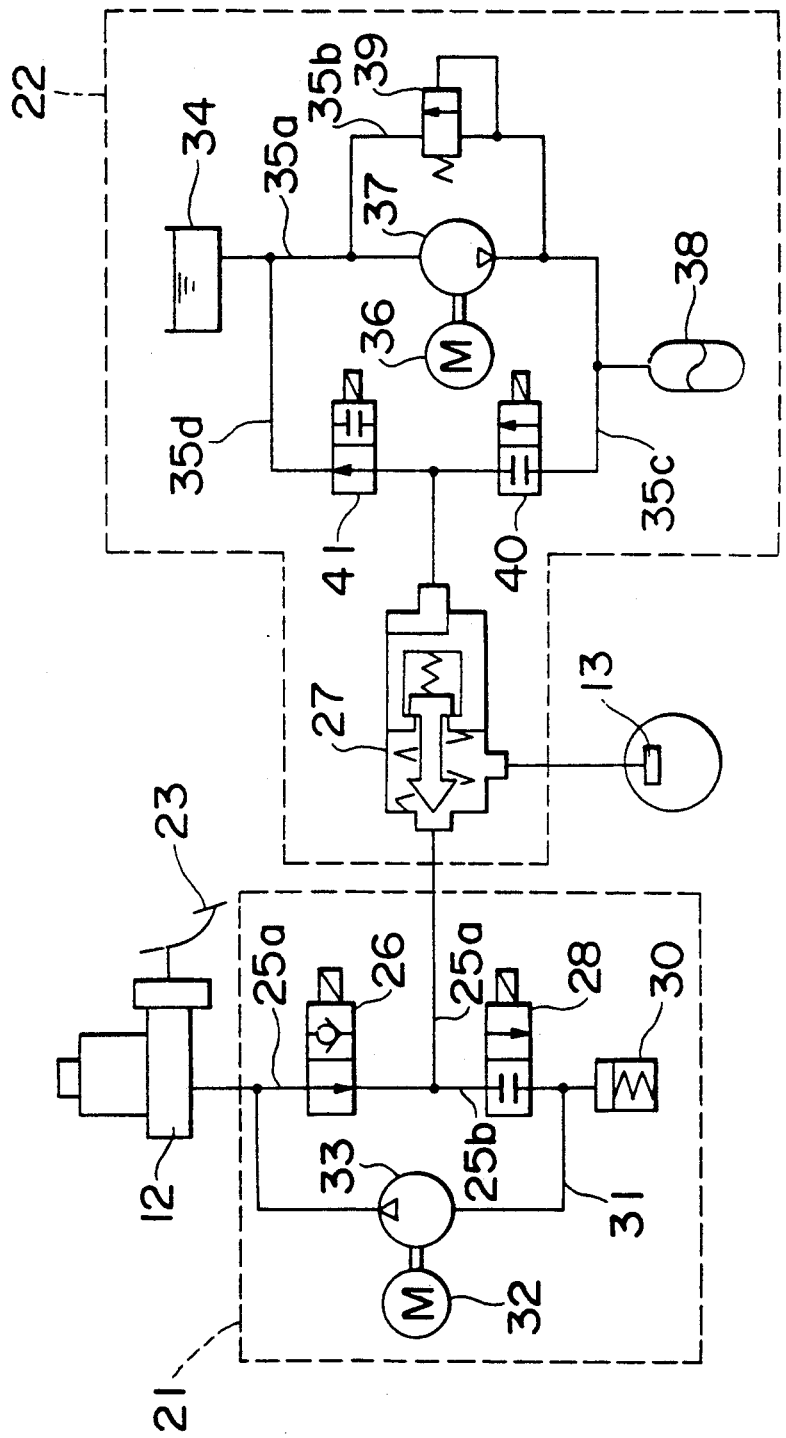
FIG. 2 is a schematic diagram showing a conventional hydraulic pressure circuit.

An embodiment of the present invention will be described with reference to FIG. 1.

In a braking hydraulic pressure control device 1 according to the present invention, a hydraulic pressure master path 3a extending from a master cylinder 12 coupled to a brake pedal 2 to a wheel cylinder 13 includes a first valve unit or cut valve 4 and a second valve unit or hold valve 5. Each of the valves 4 and 5 is made of an electromagnetic valve of the normally open type. In normal braking condition, the master cylinder 12 and the wheel cylinder 13 of driving wheel are communicated with each other.

Provided between the wheel cylinder 13 and the inlet side of the cut valve 4 is a hydraulic pressure return path 3b leading to the master cylinder 12, which includes a third valve unit or decay valve 6, a reservoir 7, and a first pump P1 driven by a motor M.

The decay valve 6 is made of an electromagnetic valve of the normally closed type, which during antilock control and traction control operates to decompress the wheel cylinder 13. In the embodiment, the decompression of the wheel cylinder 13 is performed by means of only one decay valve 6.

The master cylinder 12 is equiped with a main reservoir 9 acting as braking liquid supply source, and a hydraulic pressure auxiliary path 3c is provided between the main reservoir 9 and the inlet side of the hold valve 5. This hydraulic pressure auxiliary path 3c includes a second pump P2 driven by the motor M which drives the first pump P1 also, an accumulator 8 in which liquid is accumulated by the second pump P2, and a fourth valve unit or buildup valve 10 of the normally closed type. A bypass path 3d bypassing the second pump P2 includes a relief valve 11.

During antilock control, the foregoing hydraulic pressure circuit operates as follows.

During vehicle braking, when a control section not shown detects a fear of wheel locking, the hold valve 5 is closed to shut off the hydraulic pressure master path 3a, the decay valve 6 is opened to lead the pressurized liquid in wheel cylinder 13 to the hydraulic pressure return path 3b, and thus, the liquid is absorbed into the reservoir 7. The pressurized liquid in the reservoir 7 is returned by the first pump P1 through the hydraulic pressure return path 3b to the outlet side of the master cylinder 12 (or to the inlet side of the cut valve 4).

After the wheel cylinder is decompressed down to a given level, when it is desired to preserve the internal pressure of the wheel cylinder 13, the decay valve 6 is closed while keeping the hold valve 5 closed.

Then, when to re-pressurize the wheel cylinder 13, the hold valve 5 is opened to supply the braking hydraulic pressure of the master cylinder 12 through the hydraulic pressure master path 3a to the wheel cylinder 13.

During traction control, the following operation is performed.

At the time of vehicle starting or accelerating, when the control section not shown detects a fear of driving wheel slipping, the cut valve 4 is closed and the buildup valve 10 is opened concurrently. As a result, the pressurized liquid held in the accumulator 8 is applied through the hydraulic pressure auxiliary path 3c and the hydraulic pressure master path 3a to the wheel cylinder 13 to perform driving wheel braking. At this time, the second pump P2 is operated to supply the braking hydraulic pressure from the main reservoir 9 to the hydraulic pressure auxiliary path 3c.

Then, when it is desired to maintain the pressurized condition of the wheel cylinder 13 as it is, the hold valve 5 is closed to shut off the supply of the hydraulic pressure from the accumulator 8.

Then, when it is desired to decompress the wheel cylinder 13, the decay valve 6 is opened while keeping the hold valve 5 closed to send the hydraulic pressure of the wheel cylinder 13 to the reservoir 7. At this time, since the first pump P1 in the hydraulic pressure return path 3b and the second pump P2 are driven by the same motor M, the braking liquid from the reservoir 7 is returned through the hydraulic pressure return path 3b to the outlet side of the master cylinder 12 (or to the inlet side of the cut valve 4).

As described above, in the embodiment, the antilock control system and the traction control system are combined integrally together; thus, the piping of the control device can be remarkably simplified and the transmission efficiency of hydraulic pressure can be enhanced.

Further, the single motor M is used to drive the first pump P1 for returning the hydraulic pressure from the wheel cylinder 13 to the side of the master cylinder 12 and the second pump P2 used for traction control; thus, the whole device can be miniaturized.

Further, the cut valve 4 is included in the hydraulic pressure master path 3a, eliminating a traction piston, and the single hydraulic pressure return path 3b is used to return the hydraulic pressure from the wheel cylinder 13 in two modes of antilock control and traction control; thus, only one decay valve 6 is enough for control as compared with the conventional structure which includes a few decay valves (28 and 41), that is, the number of components of the hydraulic pressure circuit can be reduced.

What is claimed is:

1. A braking hydraulic pressure control device comprising:
   a first valve unit provided on a hydraulic pressure master path extending from master cylinder to a wheel cylinder of a driving wheel,
   a second valve unit connected between the first valve unit and the wheel cylinder for maintaining the internal hydraulic pressure of the wheel cylinder,
   a third valve unit connected between the wheel cylinder and a reservoir for decompressing the wheel cylinder,
   a hydraulic pressure return path which extends from said wheel cylinder through the third valve unit to said hydraulic pressure master path, said return path intersecting said master path between the master cylinder and the first valve unit,
   a hydraulic pressure auxiliary path for supplying a braking liquid to the inlet side of the second valve unit included in the hydraulic pressure master path
   a first pump provided in the hydraulic pressure return path for antilock control,
   a second pump provided in the hydraulic pressure auxiliary path for traction control,
   an accumulator in which hydraulic pressure is pressurized by the second pump for traction control, and
   a motor for simultaneously driving said first and second pumps.

2. A braking hydraulic pressure control device according to claim 1, wherein the second pump for traction control is connected between a main reservoir and the accumulator for accumulating hydraulic pressure in the accumulator.

3. A braking hydraulic pressure control device according to claim 1, wherein the hydraulic pressure auxiliary path includes a fourth valve unit for controlling the supply of the pressurized liquid from the accumulator.

* * * * *

UNITED STATES PATENT AND TRADEMARK OFFICE
CERTIFICATE OF CORRECTION

PATENT NO. : 5,165,764
DATED : November 24, 1992
INVENTOR(S) : Katsuya Miyaka, et al It is certified that error appears in the above-indentified patent and that said Letters Patent is hereby corrected as shown below:

On the title page, Item [76] Inventors: change "Katsuka" to --Katsuya--.

Signed and Sealed this

Eighteenth Day of January, 1994

Attest:

BRUCE LEHMAN

*Attesting Officer*            *Commissioner of Patents and Trademarks*